US006778812B1

(12) United States Patent
Zhang (10) Patent No.: US 6,778,812 B1
(45) Date of Patent: Aug. 17, 2004

(54) SYSTEM AND METHOD FOR CALL ADMISSION CONTROL

(75) Inventor: Guodong Zhang, Patchogue, NY (US)

(73) Assignee: InterDigital Technology Communication, Wilmington, DE (US)

( * ) Notice: Subject to any disclaimer, the term of this patent is extended or adjusted under 35 U.S.C. 154(b) by 0 days.

(21) Appl. No.: 10/331,442

(22) Filed: Dec. 30, 2002

Related U.S. Application Data (60) Provisional application No. 60/383,273, filed on May 24, 2002.

(51) Int. Cl.[7] .......................... H04B 17/00; H04B 7/20; H04Q 7/00
(52) U.S. Cl. .................... 455/67.13; 455/450; 455/509; 455/436; 455/67.11; 370/329
(58) Field of Search ................................. 455/450, 451, 455/452.1, 452.2, 453, 67.11, 67.13, 63.1, 561, 509, 436; 370/329, 335, 343, 331, 332, 333

(56) References Cited

U.S. PATENT DOCUMENTS

| 5,799,243 | A | * | 8/1998 | Ojaniemi | 455/63.1 |
|---|---|---|---|---|---|
| 5,838,671 | A | * | 11/1998 | Ishikawa et al. | 370/335 |
| 5,886,988 | A | * | 3/1999 | Yun et al. | 370/329 |
| 6,097,956 | A | * | 8/2000 | Veeravalli et al. | 455/446 |
| 6,128,506 | A | * | 10/2000 | Knutsson et al. | 455/522 |
| 6,278,882 | B1 | * | 8/2001 | Choi | 455/453 |
| 6,628,956 | B2 | * | 9/2003 | Bark et al. | 455/522 |
| 6,631,269 | B1 | * | 10/2003 | Cave | 455/450 |
| 2002/0119796 | A1 | * | 8/2002 | Vanghi | 455/522 |
| 2003/0060209 | A1 | * | 3/2003 | Bruin et al. | 455/452 |
| 2003/0063576 | A1 | * | 4/2003 | DiFazio | 370/280 |
| 2004/0042394 | A1 | * | 3/2004 | Nielsen et al. | 370/218 |

FOREIGN PATENT DOCUMENTS

| CN | 1297660 | 5/2001 |
|---|---|---|
| CN | 1371226 | 9/2002 |
| JP | 8307307 | 12/2000 |

* cited by examiner

*Primary Examiner*—Lee Nguyen
*Assistant Examiner*—Raymond B. Persino
(74) *Attorney, Agent, or Firm*—Volpe and Koenig, P.C.

(57) ABSTRACT

A call admission control method which operates under a variety of conditions. When only common measurements are available, the call admission control function at the CRNC will accept or reject a request based on: common measurements of the target cell and neighboring cells; estimated common measurements after admission; and the measure of load of the target cell and neighboring cells. When no measurements are available, the call admission control function at the CRNC can accept or reject a request based on estimated load of the target cell and neighboring cells, instead of relying on UE/UTRAN measurements. The load may be estimated using the following information: 1) required signal to noise ratio (SIR) of the radio link setup/reconfiguration request; and 2) required SIR of existing CCTrCHs in the target cell and neighboring cells. Finally, the call admission control function at CRNC can accept or reject a request based on estimated outage probability of the target cell and neighboring cells based on assumption of time-variant SIR. One embodiment for estimating the outage probability is to use the following information: 1) required signal to noise ratio (SIR) and SIR range of the radio link setup/reconfiguration request; 2) required SIR and SIR range of existing CCTrCHs in the target cell and neighboring cells; and 3) outage probability can be defined as the probability that the instantaneous load in a time slot exceeds a maximum allowed value.

13 Claims, 3 Drawing Sheets

SYSTEM AND METHOD FOR CALL ADMISSION CONTROL

CROSS REFERENCE TO RELATED APPLICATION(S)

This application claims priority from United States Provisional Patent Application No. 60/383,273, filed May 24, 2002, which is incorporated by reference as if fully set forth.

BACKGROUND

The present invention is directed to strategies and algorithms by which CDMA networks perform call admission control (CAC) in three different situations: 1) when only common-measurements are available; 2) when no measurements are available; and 3) based on outage probability requirements. In particular, it is applicable to Universal Mobile Telephone System—Time Division Duplex (UMTS—TDD) systems.

Call admission control (CAC) is a function responsible for deciding whether to accept or reject a request to setup or reconfigure a radio access bearer in the radio access network (RAN). CAC is performed at the Controlling Remote Network Controller (CRNC). Sometimes, although UE dedicated measurements are not available, common measurements such as uplink timeslot ISCP and downlink carrier power are available. Thus, the CRNC must have the ability to perform CAC properly with only common measurements.

Sometimes, no measurements are available. In this case, the CRNC must have the ability to perform CAC properly in absence of measurements.

In a UMTS—TDD system, the required SIR of a user changes with time because of fading and imperfect power control. In such a system, outage probability is a good measure of system quality of service (QoS). CAC should be designed to provide the required outage probability to the system.

SUMMARY

The present invention is able to perform CAC under a variety of conditions. When only common measurements are available, CAC will accept or reject a request based on: 1) common measurements of the target cell and neighboring cells; 2) estimated common measurements after admission; and the measure of the loading of the target cell and neighboring cells, (which are also estimated from common measurements). When the CAC assigns codes of the CCTrCH to different time slots, it will try to optimize the load or carrier power of the target cell and neighboring cells; whereby average or weighted average load/carrier power of the target cell and neighboring cells can be used.

When no measurements are available, CAC accepts or rejects a request based on estimated load of the target cell and neighboring cells. The load may be estimated using the following information: 1) required signal to noise ratio (SIR) of the radio link setup/reconfiguration request, (this represents the load of the request); and 2) required SIR of existing call code-composite transport channels (CCTrCHs) in the target cell and neighboring cells, (this represents the current load of the target cell and neighboring cells). When CAC assigns codes of the CCTrCH to different time slots, it will try to optimize the load of the target cell and neighboring cells; whereby average or weighted average load of the target cell and neighboring cells can be used.

Finally, an alternative embodiment of the present invention can accept or reject a request based on the estimated outage probability of the target cell and neighboring cells. The estimated outage probability is based on assumption of the time-variant SIR. One alternative for estimating the outage probability is to use: 1) required signal to noise ratio (SIR) and SIR range of the radio link setup/reconfiguration request, (this represents the range of load of the request); 2) required SIR and SIR range of existing CCTrCHs in the target cell and neighboring cells, (this represents the current range of load of the target cell and neighboring cells); and 3) the outage probability, which is defined as the probability that the instantaneous load in a time slot exceeds a maximum allowed value. When CAC assigns codes of the CCTrCH to different time slots, it will try to minimize the total outage probability of the CCTrCH, ensuring that the outage probability of assigned timeslots in neighboring cells also meets the requirements.

DETAILED DESCRIPTION OF THE PREFERRED EMBODIMENT(S)

The present invention will be described with reference to the drawing figures wherein like numerals represent like elements throughout.

Figure 1:
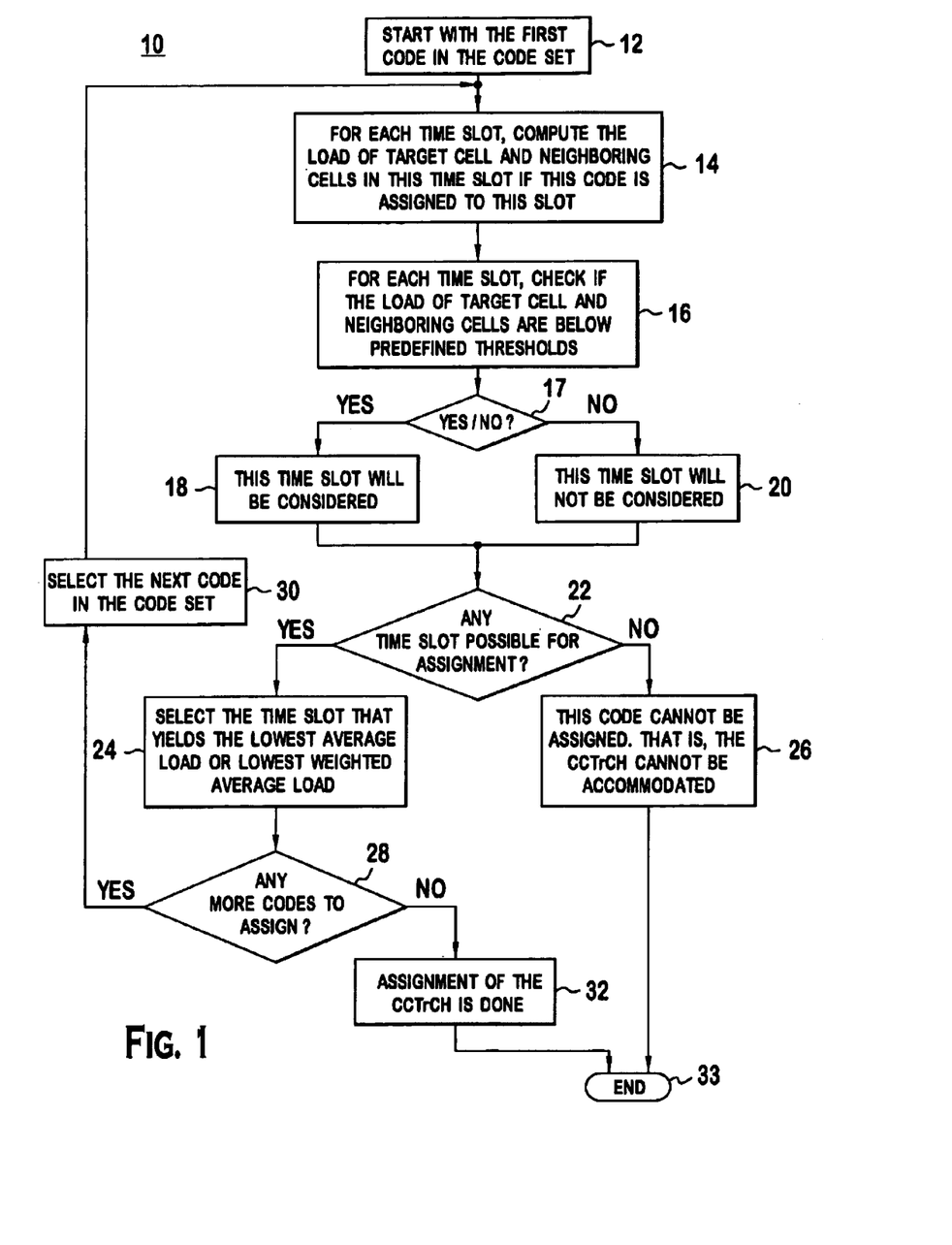
FIG. 1 is a flow diagram of a slot selection procedure for the uplink and downlink for a first embodiment in accordance with the present invention.

A first embodiment of the present invention is directed to CAC with only common measurements available. Referring to FIG. 1, the basic assignment procedure 10 for CAC in the Uplink is shown. The procedure 10 commences with the first code in the code set (step 12). The load of an uplink time slot in cell i is defined as the load generated by the codes assigned in the same time slot in this cell and in first tier cells and second tier cells, since the load generated from cells beyond second tier is negligible. Preferably the load from neighboring cells is measured using the uplink time slot ISCP. Uplink time slot ISCP contains inter-cell interference only. For the target cell, the load after admission can be calculated as follows:

The load from its own cell is called the intra-cell load $Load_{UL\_Intra}(i)$ and is given by:

$$Load_{UL\_Intra}(i) = \alpha_{UL} \cdot \sum_{h \in \Omega(i)} SIR_h \qquad \text{Equation 1}$$

where $\Omega(i)$ is the set of codes assigned in this time slot in the cell i. Since the load is defined based on noise rise, then intra-cell interference $I_{Intra}$ may be given by:

$$\text{Intra-cell noise rise} = \frac{I_{intra}}{N_0} = \frac{1}{1 - Load_{UL\_intra}(i)} \qquad \text{Equation 2}$$

Which can be rewritten as:

$$I_{intra} = \frac{N_0}{1 - Load_{UL\_intra}(i)} \qquad \text{Equation 3}$$

The total interference can be found by:

$$\text{Total noise rise} = \frac{I_{intra} + ISCP}{N_0} = \frac{1}{1 - Load_{UL}(i)} \qquad \text{Equation 4}$$

Then, the total load is given by:

$$1 - Load_{UL}(i) = 1 - \frac{1}{\text{Total noise rise}} = 1 - \frac{n_0}{I_{intra} + ISCP} \qquad \text{Equation 5}$$

For neighboring cells, (tier one or tier two cells only), the load after admission can be calculated as follows:
The load of a time slot in cell j before admission is calculated using Equations 1–5, and denoted by $Load_{UL\_Before}(j)$. If $SIR_t$ is the required SIR target of the code to be assigned in this time slot in the target cell i, the load of a time slot in cell j after admission, denoted by $Load_{UL}(j)$, is given by:

$$Load_{UL}(j) = \begin{cases} Load_{UL\_Before}(j) + \beta_{UL} \cdot SIR_t & \text{if } j \in \text{Tier One}(i) \\ Load_{UL\_Before}(j) + \sigma_{UL} \cdot SIR_t & \text{if } j \in \text{Tier One}(i) \end{cases} \qquad \text{Equation 6}$$

Where Tier One(i) is the set of codes assigned in this time slot in tier-one neighboring cells of the cell i, and Tier Two(i) is the set of codes assigned in this time slot in tier-two neighboring cells of the cell i.

For CAC, a code will be admitted into a time slot in cell i only if, after admission, the following conditions can be satisfied in this time slot:

$$Load_{UL}(i) \leq CAC\_Target\_Load\_Thres\_UL \qquad \text{Equation 7}$$

and $$Load_{UL}(j) \leq CAC\_Neighbor\_Load\_Thres\_UL, \forall j \epsilon \text{Tier One}(i) \cup \text{Tier Two}(i) \qquad \text{Equation 8}$$

Where CAC_Target_Load_Thres_UL is the admission threshold of load in the target cell, and CAC_Neighbor_Load_Thres_UL is the admission threshold of load in the neighboring cells.

A measure of the quality after admission is the average load, $$\overline{Load_{UL}},$$

which is defined as the average load of target cell and neighboring cells. It is given by:

$$\overline{Load_{UL}} = \frac{1}{N} \sum_{j=1}^{N} Load_{UL}(j) \qquad \text{Equation 9}$$

An alternative measure is the weighted average load in the uplink, $$\overline{Load_{UL\_Weighted}},$$

which is similar to Equation 9, but gives priority to the target cell load by using a weight factor w (w>1) for the target cell. It is given by:

$$\overline{Load_{UL\_Weighted}} = \frac{1}{N} \sum_{j=1, j \neq i}^{N} (Load_{UL}(j) + w \cdot Load_{UL}(i)) \qquad \text{Equation 10}$$

Slot Selection Procedure For Call Admission Control in the Uplink

Suppose that the new CCTrCH seeking admission has M codes in its code set to be assigned. These M codes are arranged in the order of increasing spreading factor, (decreasing required SIR target). The slot selection follows the procedures below:

1. Start with the first code in the code set (step 12—FIG. 1).
2. For each uplink time slot, compute the load of target cell and neighboring cells in this time slot using Equation 1 as if this code is assigned into this time slot (step 14).
3. For each uplink time slot, judge if this code can be assigned to this time slot by checking if load of target cell and neighboring cells in this time slot after assignment satisfies conditions in Equations 7 and 8 (steps 16, 17).
   a. If yes, this time slot will be considered as possible time slot for assignment in step 4 (step 18).
   b. Otherwise, this time slot will not be considered as possible time slot for assignment in step 4 (step 20).
4. Check if there are any, possible time slots for assignment (22).
   a. If there is at least one possible time slot for assignment, among all possible time slots, select the time slot that yields the lowest average load as defined in Equation 9 or the lowest weighted average load as defined in Equation 10 (step 24). This code will be assigned to this selected time slot. Go to step 5.
   b. Otherwise, this code cannot be assigned in the target cell (step 26). It also means the CCTrCH with this code set cannot be accommodated in the target cell. The slot selection procedure ends (33).
5. Check if there are any more codes to be assigned (28).
   a. If yes, select the next code in the code set (30), and go to step 2.
   b. Otherwise, the assignment of the CCTrCH is done (32). The slot selection procedure ends.

The flowchart of the slot selection procedure in the uplink is shown in FIG. 1.

Basic Assignment Procedure for Call Admission Control in the Downlink

Let CaPwr(i) denote the carrier power of a downlink time slot in the cell i. Let $SIR_t$ denote the required SIR target of the code to be assigned in this time slot in the target cell i. Let PL(k) denote the pathloss of this UE between BS of cell k, k=1, 2, . . . , N. The code TX power for this new code, denoted by $TX_{code}$, is given by:

$$TX_{code} = SIR_t \cdot PL(i) \cdot I_{total} \qquad \text{Equation 11}$$

and $I_{total}$ is given by:

$$I_{total} = \alpha_{DL} \cdot CaPwr(i)/PL(i) + \sum_{j \in Tier\text{-}One(i)} CaPwr(j)/PL(j) + \sum_{j \in Tier\text{-}Two(j)} CaPwr(j)/PL(j) + N_0 \quad \text{Equation 12}$$

When the system is at moderate or high load, (where call admission control is really put in use), background noise $N_0$ is negligible. Therefore, Equation 11 is rewritten as:

$$TX_{code} = \quad \text{Equation 13}$$
$$SIR_t \cdot \left( \alpha_{DL} \cdot CaPwr(i) + \sum_{j \in TierOne(i)} CaPwr(j) \cdot PL(i)/PL(j) + \sum_{j \in TierTwo(j)} CaPwr(j) \cdot PL(i)/PL(j) \right)$$

If we let $$X = \sum_{j \in TierOne(i)} CaPwr(j) \cdot PL(i)/PL(j),$$

for UE at different locations, (which implies different pathloss to BS), X is a random variable. Define $\omega_{DL}$ as:

$$\omega_{DL} = \arg\min \left\{ \omega_{DL} : Pr\left( X \le \omega_{DL} \cdot \sum_{j \in TierOne(i)} CaPwr(j) \right) > \theta \right\} \quad \text{Equation 14}$$

Where $\theta$ is a predefined percentage, for example, 90%.
Similarly, if we let $$Y = \sum_{j \in TierTwo(i)} CaPwr(j) \cdot PL(i)/PL(j),$$

for UE at different locations, (which implies different pathloss to BS), Y is a random variable. Define $\xi_{DL}$ as $$\xi_{DL} = \arg\min \left\{ \xi_{DL} : Pr\left( Y \le \xi_{DL} \cdot \sum_{j \in TierTwo(i)} CaPwr(j) \right) > \theta \right\} \quad \text{Equation 15}$$

Then, Equation 13 can be written as:

$$TX_{code} = SIR_t \cdot \left( \alpha_{DL} \cdot CaPwr(i) + \omega_{DL} \cdot \sum_{j \in Tier\text{-}One(i)} CaPwr(j) + \xi_{DL} \cdot \sum_{j \in Tier\text{-}Two(j)} CaPwr(j) \right) \quad \text{Equation 16}$$

After the new code is added, the sum of code transmit power of existing codes will increase by $\Delta TX(i)$. The value of $\Delta TX(i)$ is estimated to be:

$$\Delta TX(i) = \quad \text{Equation 17}$$
$$\frac{\alpha_{DL} \cdot TX_{code}}{\alpha_{DL} \cdot CaPwr(i) + \omega_{DL} \cdot \sum_{j \in Tier\text{-}One(i)} CaPwr(j) + \xi_{DL} \cdot \sum_{j \in Tier\text{-}Two(i)} CaPwr(j)} CaPwr(i)$$

Therefore, the carrier power of cell i after admission is estimated to be:

$$CaPwr(i)' = CaPwr(i) + TX_{code} + \Delta TX(i) + Margin_{target\ cell} \quad \text{Equation 18}$$

Where $Margin_{target\ cell}$ is the margin used for call admission control in the target cell.

The increase to the carrier power of cell j (if $j \in$ Tier One(i)) after admission, $\Delta TX(j)$, is estimated to be:

$$\Delta TX(j) = \quad \text{Equation 19}$$
$$\frac{\omega_{DL} \cdot (TX_{code} + \Delta TX(i))}{\alpha_{DL} \cdot CaPwr(j) + \omega_{DL} \cdot \sum_{k \in Tier\text{-}One(j)} CaPwr(k) + \xi_{DL} \cdot \sum_{k \in Tier\text{-}Two(j)} CaPwr(k)} CaPwr(j)$$

The increase to the carrier power of cell j (if $j \in$ Tier Two(i)) after admission, $\Delta TX(j)$, is estimated to be:

$$\Delta TX(j) = \quad \text{Equation 20}$$
$$\frac{\xi_{DL} \cdot (TX_{code} + \Delta TX(i))}{\alpha_{DL} \cdot CaPwr(j) + \omega_{DL} \cdot \sum_{k \in Tier\text{-}One(j)} CaPwr(k) + \xi_{DL} \cdot \sum_{k \in Tier\text{-}Two(j)} CaPwr(k)} CaPwr(j)$$

Therefore, the carrier power of cell j after admission is estimated to be:

$$CaPwr(j)' = CaPwr(j) + \Delta TX(j) + Margin_{neighbor\ cell} \quad \text{Equation 21}$$

Where $Margin_{neighbor\ cell}$ is the margin used for call admission control in neighboring cells.

At call admission control, a code will be admitted into a time slot in cell i only if after admission the following conditions can be satisfied in this time slot:

$$CaPwr(i)' \le CaPwr_{maximum} \quad \text{Equation 22}$$

and $$CaPwr(j)' \le CaPwr_{maximum}, \forall j \in \text{Tier-One}(i) \cup \text{Tier-Two}(i) \quad \text{Equation 23}$$

Where $CaPwr_{maximum}$ is the maximum allowed carrier power at Node-B.

A measure of the quality after admission is the average carrier power, $\overline{CaPwr}$, which is defined as the average carrier power of target cell and neighboring cells. It is given by $$\overline{CaPwr} = \frac{1}{N} \sum_{j=1}^{N} CaPwr(j) \quad \text{Equation 24}$$

An alternative measure is the weighted average load in the uplink, $\overline{CaPwr_{Weighted}}$, which is similar to the definition in Equation 24, but gives priority to the target cell's carrier power by using a weight factor w (w>1) for the target cell. It is given by $$\overline{CaPwr_{Weighted}} = \frac{1}{N} \left( \sum_{j=1, j \ne 1}^{N} CaPwr(j) + w \cdot CaPwr(i) \right) \quad \text{Equation 25}$$

Slot Selection Procedure for Call Admission Control in the Downlink

Suppose that the new CCTrCH seeking admission has M codes in its code set to be assigned. Since the direction is downlink; the M codes have the same spreading factors 16 or 1. Therefore, the order of assignment for codes does not matter in the downlink. The slot selection follows the procedures below:

1. Start with the first code in the code set.
2. For each downlink time slot, estimate the carrier power of target cell and neighboring cells in this time slot using Equations 16–21 as if this code is assigned into this time slot.

3. For each downlink time slot, judge if this code can be assigned to this time slot by checking if carrier power of target cell and neighboring cells in this time slot after assignment satisfies conditions in Equations 22 and 23.
   a. If yes, this time slot will be considered as possible time slot for assignment in step 4.
   b. Otherwise, this time slot will not be considered as possible time slot for assignment in step 4.
4. Check if there are any.possible time slots for assignment.
   a. If there is at least one possible time slot for assignment, among all possible time slots, select the time slot that yields the lowest average carrier power as defined in Equation 24 or the lowest weighted average carrier power as defined in Equation 25. This code will be assigned to this selected time slot. Go to step 5.
   b. Otherwise, this code cannot be assigned in the target cell. It also means the CCTrCH with this code set cannot be accommodated in the target cell. The slot selection procedure ends.
5. Check if there is any more code to be assigned.
   a. If yes, select the next code in the code set, and go to step 2.
   b. Otherwise, the assignment of the CCTrCH is done. The slot selection procedure ends.

The flowchart of slot selection procedure in the downlink is the same as in the uplink (as shown in FIG. 1), except that call admission control tries to minimize the average carrier power instead of average load.

The second embodiment of the present invention is directed to call admission control in the absence of measurements.

Basic Assignment Procedure for Call Admission Control in the Uplink

The load of an uplink time slot in a cell is defined as the load generated by the codes assigned in the same time slot in this cell and in first tier cells and second tier cells (load generated from cells beyond second tier is negligible). Then, the load in a cell k is:

$$Load_{UL}(k) = \alpha_{UL} \cdot \sum_{h \in \Omega(k)} SIR_h + \beta_{UL} \cdot \sum_{h \in TierOne(k)} SIR_h + \sigma_{UL} \cdot \sum_{h \in TierTwo(k)} SIR_h,$$

$$k = 1, 2, \ldots, N$$

Equation 26

Where $\alpha_{UL}$ is the average MUD residual factor in the uplink, $\beta_{UL}$ is the weight factor for codes in the tier-one cells in the uplink, $\sigma_{UL}$ is the weight factor for codes in the tier-two cells in the uplink, $\Omega(k)$ is the set of codes assigned in this time slot in the cell k, Tier One(k) is the set of codes assigned in this time slot in tier-one neighboring cells of the cell k, Tier Two(k) is the set of codes assigned in this time slot in tier-two neighboring cells of the cell k.

At call admission control, a code will be admitted into a time slot in cell i only if after admission the following conditions can be satisfied in this time slot:

$$Load_{UL}(i) \leq CAC\_Target\_Load\_Thres\_UL \quad \text{Equation 27}$$

and $$Load_{UL}(j) \leq CAC\_Neighbor\_Load\_Thres\_UL, \forall j \in \text{Tier One}(i) \cup \text{Tier Two}(i) \quad \text{Equation 28}$$

Where CAC_Target_Load_Thres_UL is the admission threshold of load in the target cell, and CAC_Neighbor_Load_Thres_UL is the admission threshold of load in the neighboring cells.

A measure of the quality after admission is the average load in the uplink, $\overline{Load_{UL}}$, which is defined as the average load of target cell and neighboring cells. It is given by:

$$\overline{Load_{UL}} = \frac{1}{N} \sum_{j=1}^{N} Load_{UL}(j) \quad \text{Equation 29}$$

An alternative measure is the weighted average load in the uplink, $$\overline{Load_{UL\_Weighted}},$$

which is similar to the definition in Equation 29, but gives priority to the target cell load by using a weight factor w (w>1) for the target cell. It is given by:

$$\overline{Load_{UL\_Weighted}} = \frac{1}{N} \left( \sum_{j=1, j \neq i}^{N} Load_{UL}(j) + w \cdot Load_{UL}(i) \right) \quad \text{Equation 30}$$

Slot Selection Procedure for Call Admission Control in the Uplink

Suppose that the new CCTrCH seeking admission has M codes in its code set to be assigned. These M codes are arranged in the order of increasing spreading factor (decreasing required SIR target). The slot selection follows the procedures below:

1. Start with the first code in the code set.
2. For each uplink time slot, compute the load of target cell and neighboring cells in this time slot using Equation 26 as if this code is assigned into this time slot.
3. For each uplink time slot, judge if this code can be assigned to this time slot by checking if load of target cell and neighboring cells in this time slot after assignment satisfies conditions in Equations 27 and 28.
   c. If yes, this time slot will be considered as possible time slot for assignment in step 4.
   d. Otherwise, this time slot will not be considered as possible time slot for assignment in step 4.
4. Check if there are any possible time slots for assignment.
   e. If there is at least one possible time slot for assignment, among all possible time slots, select the time slot that yields the lowest average load as defined in Equation 29 or the lowest weighted average load as defined in Equation 30. This code will be assigned to this selected time slot. Go to step 5.
   f. Otherwise, this code cannot be assigned in the target cell. It also means the CCTrCH with this code set cannot be accommodated in the target cell. The slot selection procedure ends.
6. Check if there is any more code to be assigned.
   a. If yes, select the next code in the code set, and go to step 2.
   b. Otherwise, the assignment of the CCTrCH is done. The slot selection procedure ends.

Figure 2:
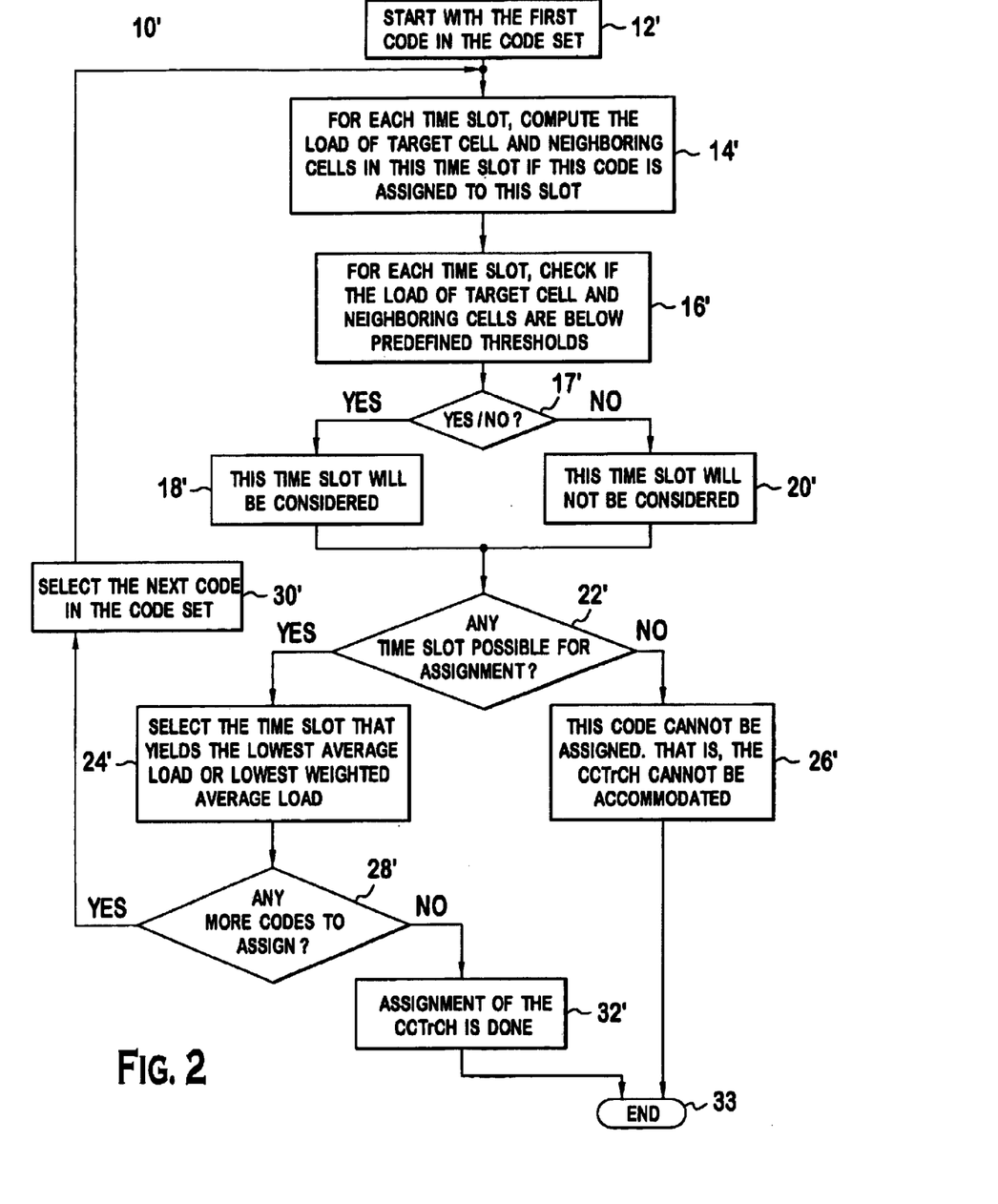
FIG. 2 is a flow diagram of a slot selection procedure for the uplink and downlink for a second embodiment in accordance with the present invention.

The flowchart of the slot selection procedure in the uplink is shown in FIG. 2.

Basic Assignment Procedure for Call Admission Control in the Downlink

The load of a downlink time slot in cell i is defined as the load generated by the codes assigned in the same time slot in this cell and in first tier cells and second tier cells (load generated from cells beyond second tier is negligible). Therefore, the load in the downlink is similar to the load in the uplink. However, there is a difference between them. In the uplink, there is only one receiver, the BS. In the downlink, there are several receivers, UEs, scattered in the cell. To compensate this difference, a scale factor is added into the load calculation. Then, the load is given by:

$$Load_{DL}(k) = Scale \cdot \left( \alpha_{DL} \cdot \sum_{h \in \Omega(k)} SIR_h + \beta_{DL} \cdot \sum_{h \in TierOne(k)} SIR_h + \sigma_{DL} \cdot \sum_{h \in TierTwo(k)} SIR_h \right),$$
$$k = 1, 2, \ldots, N$$

Equation 31

Where $\alpha_{DL}$ is the average MUD residual factor in the downlink, $\beta_{DL}$ is the weight factor for codes in the tier-one cells in the downlink, $\sigma_{DL}$ is the weight factor for codes in the tier-two cells in the downlink, $\Omega(k)$ is the set of codes assigned in this time slot in the cell k, Tier One(k) is the set of codes assigned in this time slot in tier-one neighboring cells of the cell k, Tier Two(k) is the set of codes assigned in this time slot in tier-two neighboring cells of the cell k.

At call admission control, a code will be admitted into a time slot in cell i only if after admission the following conditions can be satisfied in this time slot:

$$Load_{DL}(i) \leq CAC\_Target\_Load\_Thres\_DL \quad \text{Equation 32}$$

and $$Load_{DL}(j) \leq CAC\_Neighbor\_Load\_Thres\_DL, \forall j \in \text{Tier-One}(i) \cup \text{Tier-Two}(i) \quad \text{Equation 33}$$

Where CAC_Target_Load_Thres_DL is the admission threshold of load in the target cell, and CAC_Neighbor_Load_Thres_D is the admission threshold of load in the neighboring cells.

A measure of the quality after admission is the average load in the downlink, $\overline{Load_{DL}}$, which is defined as the average load of target cell and neighboring cells. It is given by:

$$\overline{Load_{DL}} = \frac{1}{N} \sum_{j=1}^{N} Load_{DL}(j) \quad \text{Equation 34}$$

An alternative measure is the weighted average load in the uplink, $$\overline{Load_{DL\_Weighted}},$$

which is similar to the definition in Equation 34, but gives priority to the target cell load by using a weight factor w (w>1) for the target cell. It is given by:

$$\overline{Load_{DL\_Weighted}} = \frac{1}{N} \left( \sum_{j=1, j\neq i}^{N} Load_{DL}(j) + w \cdot Load_{DL}(i) \right) \quad \text{Equation 35}$$

Slot Selection Procedure for Call Admission Control in the Downlink

Suppose that the new CCTrCH seeking admission has M codes in its code set to be assigned. Since the direction is downlink, the M codes have the same spreading factors 16 or 1. Therefore, the order of assignment for codes does not matter in the downlink. The slot selection follows the procedures below:

1. Start with the first code in the code set.
2. For each downlink time slot, compute the load of target cell and neighboring cells in this time slot using Equation 31 as if this code is assigned into this time slot.
3. For each downlink time slot, judge if this code can be assigned to this time slot by checking if load of target cell and neighboring cells in this time slot after assignment satisfies conditions in Equations 32 and 33.
   a. If yes, this time slot will be considered as possible time slot for assignment in step 4.
   b. Otherwise, this time slot will not be considered as possible time slot for assignment in step 4.
4. Check if there are any possible time slots for assignment.
   a. If there is at least one possible time slot for assignment, among all possible time slots, select the time slot that yields the lowest average load as defined in Equation 34 or the lowest weighted average load as defined in Equation 35. This code will be assigned to this selected time slot. Go to step 5.
   b. Otherwise, this code cannot be assigned in the target cell. It also means the CCTrCH with this code set cannot be accommodated in the target cell. The slot selection procedure ends.
5. Check if there is any more code to be assigned.
   a. If yes, select the next code in the code set, and go to step 2.
   b. Otherwise, the assignment of the CCTrCH is done. The slot selection procedure ends.

The flowchart of slot selection procedure is the same as in FIG. 2.

The third embodiment of the present invention is directed to call admission control based on outage probabilities Definition of Outage Probability for Call Admission Control in the Uplink The load of an uplink time slot in a cell is defined as the load generated by the users assigned in the same time slot in this cell and in first tier cells and second tier cells (load generated from cells beyond second tier is negligible). In most technical literature, the load from neighboring cells is assumed to be a fixed ratio of the load from its own cell based on the assumption of homogeneous system. However, in a heterogeneous system, the load cannot be modeled in such a way. We compute the load from neighboring cells based its actual traffic. Then, the load in a cell k is given by:

$$Load_{UL}(k) = \alpha_{UL} \cdot \sum_{h \in \Omega(k)} SIR_h + \beta_{UL} \cdot \sum_{h \in TierOne(k)} SIR_h + \sigma_{UL} \cdot \sum_{h \in TierTwo(k)} SIR_h,$$
$$k = 1, 2, \ldots, N$$

Equation 36

Where $\alpha_{UL}$ is the average MUD residual factor in the uplink, $\beta_{UL}$ is the weight factor for users in the tier-one cells in the uplink, $\sigma_{UL}$ is the weight factor for users in the tier-two cells in the uplink, $\Omega(k)$ is the set of users assigned in this time slot in the cell k, Tier One(k) is the set of users assigned in this time slot in tier-one neighboring cells of the cell k, Tier Two(k) is the set of users assigned in this time slot in tier-two neighboring cells of the cell k.

Since the load is defined based on noise rise, we have:

$$\text{Noise rise} = \frac{I_{total}}{N_0} = \frac{1}{1 - Load_{UL}(k)} \quad \text{Equation 37}$$

Because of the dynamic range limitation and for the purpose of power control stability, the noise rise at the BS should be limited a maximum value of $NR_{max}$. Then, we have:

$$\frac{I_{total}}{N_0} \leq NR_{max} \quad \text{Equation 38}$$

Therefore, Equation 38 can written as:

$$Load_{UL}(k) \leq 1 - \frac{1}{NR_{max}} \quad \text{Equation 39}$$

or $$\alpha_{UL} \cdot \sum_{h \in \Omega(k)} SIR_h + \beta_{UL} \cdot \sum_{h \in TierOne(k)} SIR_h + \sigma_{UL} \cdot \sum_{h \in TierTwo(k)} SIR_h \leq 1 - \frac{1}{NR_{max}} \quad \text{Equation 40}$$

The probability of outage in a TDD time slot i, denoted by $P_{out}$, is defined as the probability that inequality in Equation 40 does not hold. It is given by $$P_{out} = Pr\left\{\alpha_{UL} \cdot \sum_{h \in \Omega(k)} SIR_h + \beta_{UL} \cdot \sum_{h \in TierOne(k)} SIR_h + \sigma_{UL} \cdot \sum_{h \in TierTwo(k)} SIR_h > 1 - \frac{1}{NR_{max}}\right\} \quad \text{Equation 41}$$

Computation of Outage Probability

Because of fading and imperfect power control, the value of $SIR_h$ is a random variable that follows a lognormal distribution. Therefore, $SIR_h$ can be expressed as:

$$SIR_h = 10^{N(\mu_h, \sigma_h^2)} \quad \text{Equation 42}$$

Using $\psi$ to replace $$1 - \frac{1}{NR_{max}},$$

Equation 41 can be written as:

$$P_{out} = Pr\left\{\sum_{h=1}^{N} SIR_h \cdot A_h > \psi\right\} \quad \text{Equation 43}$$

Where $A_h$ is given by:

$$A_h = \begin{cases} \alpha_{UL} & h \in \Omega(k) \\ \beta_{UL} & h \in TierOne(k) \\ \sigma_{UL} & h \in TierTwo(k) \end{cases} \quad \text{Equation 44}$$

Then, we have:

$$SIR_h \cdot A_h = 10^{N(\mu_h, \sigma_h^2)} \cdot 10^{\log A_h} = 10^{N(\mu_h + \log A_h, \sigma_h^2)} \quad \text{Equation 45}$$

Let $X_h$ denote $SIR_h \cdot A_h$, then $X_h$ is still a lognormal random variable. Its mean $\mu_{X_h}$ and variance $\sigma_{X_h}^2$ are given by:

$$\mu_{X_h} = 10^{\mu_h + \log A_h} \cdot 10^{\ln 10 \sigma_h^2/2} \quad \text{Equation 46}$$

$$\sigma_{X_h}^2 = 10^{2(\mu_h + \log A_h)} \cdot 10^{\ln 10 \sigma_h^2} \cdot (10^{\ln 10 \sigma_h^2} - 1) \quad \text{Equation 47}$$

Equation 43 becomes:

$$P_{out} = Pr\left\{\sum_{h=1}^{N} X_h > \psi\right\} \quad \text{Equation 48}$$

Even though the distribution of $X_h$ is known, the computation of $P_{out}$ in Equation 48 is still very complex, and cannot be done in real time. At moderate or high system load, value of N in Equation 48 is large. Therefore, the Gaussian approximation will have both good approximation result and low computation complexity. Here, we choose the Gaussian approximation approach to allow the Radio Network Controller (RNC) to compute outage probability and make a decision of resource allocation in real time.

Consider that we have a random variable $$Y = \sum_{h=1}^{N} X_h,$$

where $\{X_h\}$ are N independent identical random variables, each with mean $\mu_{X_h}$, and variance $\sigma_{X_h}^2$. Then, we have:

$$\mu_Y = \sum_{h=1}^{N} \mu_{X_h} \quad \text{Equation 49}$$

$$\sigma_Y^2 = \sum_{h=1}^{N} \sigma_{X_h}^2 \quad \text{Equation 50}$$

Then, we have:

$$P_{out} = Pr\{Y > \psi\} = Q\left(\frac{\psi - \mu_Y}{\sigma_Y}\right) \quad \text{Equation 51}$$

Let $P_{out}(i)$ denote the outage probability of time slot i. If a user is allocated to use L slots (l=1, 2, ..., L), the total outage probability of the allocation, denoted by $P_{out\_total}$, is defined as the probability that outage occurs in at least one time slot. It is given by:

$$P_{out\_total} = 1 - \prod_{l=1}^{L}(1 - P_{out}(l)) \quad \text{Equation 52}$$

Slot Selection Procedure for Call Admission Control in the Uplink

The call admission control function will try to minimize the total outage probability of the CCTrCH while making sure that the outage probability of assigned timeslots in neighboring cells also meets the requirements.

Suppose that the new CCTrCH seeking admission in the target cell k has M codes in its code set to be assigned. These M codes are arranged in the order of increasing spreading factor (decreasing required SIR target). The slot selection follows the procedures below:

1. Start with the first code in the code set (see FIG. 3—step 36).

Figure 3:
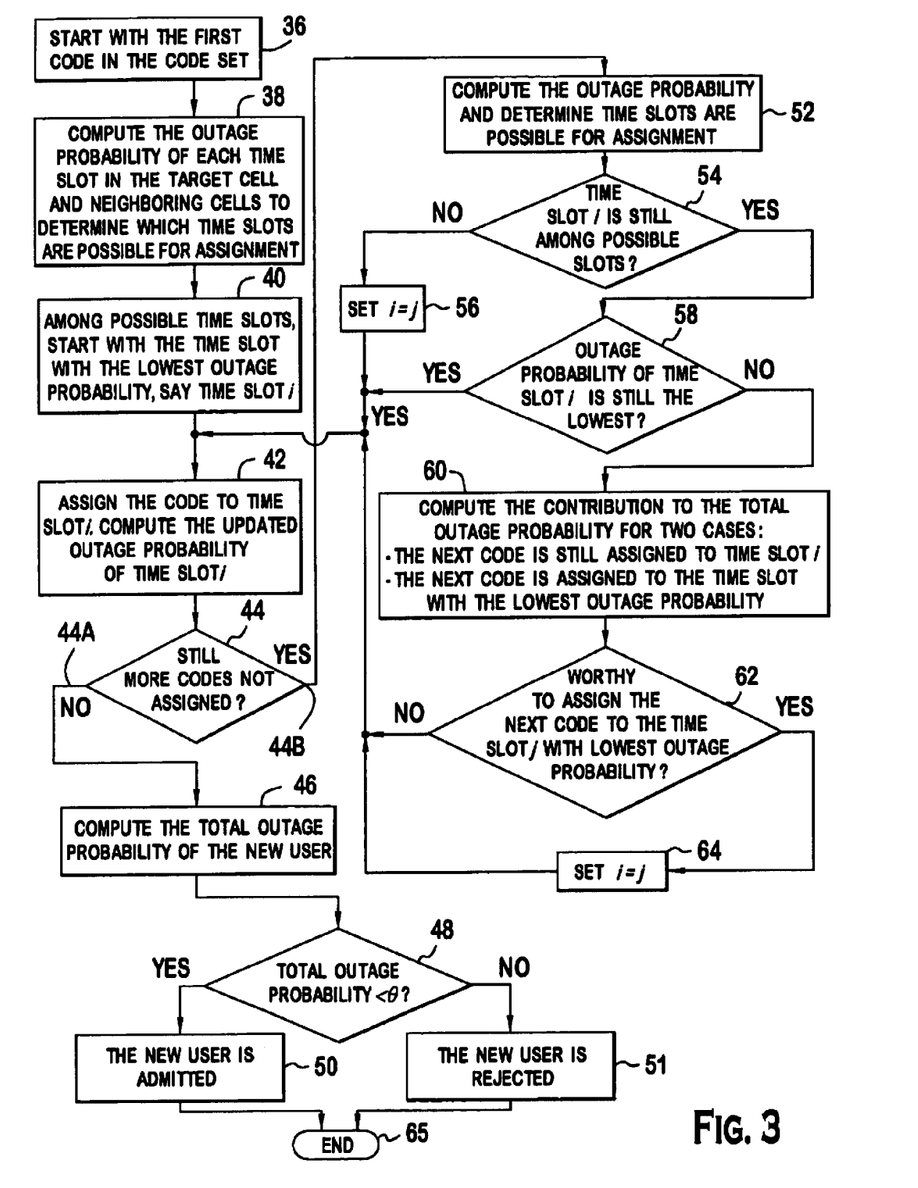
FIG. 3 is a flow diagram of a slot selection procedure for the uplink and downlink for a third embodiment in accordance with the present invention.

2. Compute the current outage probability of each time slot in the target cell (38). Also compute the outage probability of each time slot in the neighboring cells as if this code is assigned& into the time slot (38).
   a. If outage probability of all neighboring cells are less than the maximum allowed outage probability, say τ, then this time slot can be considered for assignment.
   b. Otherwise, this time slot cannot be considered for assignment.
3. Among possible time slots for assignment, start with time slot with the lowest outage probability, say time slot I (40).
4. Assign the code into the time slot i. and compute the updated outage probability of the time slot (42).
5. Check if there are still more codes not assigned for the user (44).
   a. If no, all codes are already assigned. Go to step 7 (below).
   b. Otherwise, continue to step 6 (below) to assign the next code in the code set.
6. Branching at 44B, compute the outage probability of each time slot in the neighboring cells as if this code is assigned into the time slot 52. Check if time slot i is still among those possible time slots (54).
   a. If no, find the time slot with the lowest outage probability among those possible time slots, say slot j. Set i=j (56), and go to step 4 (42).
   b. Otherwise, check if the outage probability of time slot i is still the lowest among those possible time slots (58).
      i. If yes, go to step 4 (42).
      ii. Otherwise, compute if it is worthy to assign the next code into the time slot with the lowest outage probability, say slot j. This is done by comparing the contribution to the total outage probability by those codes already assigned to time slot i and this code. The contribution to total outage probability if this code is put into slot j, denoted by $P_{contribution}$, is given by $$P_{contribution} = 1 - (1 - P_{out}(i)) \cdot (1 - P_{out}(j))$$

The contribution to total outage probability if this RU is still assigned into slot i, de noted by $P'_{contribution}$, is same as the outage probability in slot i. That is, $P'_{contribution} = P_{out}(i)'$.
   Check if $P_{contribution} \geq P'_{contribution}$ (62).
   1. If yes, go to step 4.
   2. Otherwise, set i=j (64), and go to step 4.
7. Compute the total outage probability of the allocation (46), $P_{out\_total}$, as in Equation 52. Check if $P_{out\_total} \leq \theta$ (48).
   a. If yes, the user will be admitted (50).
   b. Otherwise, the user will be rejected (51).

The flow chart of the call admission control algorithm is shown in FIG. 3.

Call Admission Control in the Downlink

The call admission control function in the downlink is similar to uplink. However, there are some differences in load definition and its physical meaning:

In the uplink, there is only one receiver, the BS. In the downlink, there are several receivers, UEs, scattered in the cell. To compensate this difference, a scale factor is added into the load calculation. Then, the load is given by:

$$Load_{DL}(k) = Scale \cdot \left( \alpha_{DL} \cdot \sum_{h \in \Omega(k)} SIR_h + \beta_{DL} \cdot \sum_{h \in TierOne(k)} SIR_h + \sigma_{DL} \cdot \sum_{h \in TierTwo(k)} SIR_h \right),$$
$$k = 1, 2, \ldots, N$$

Equation 53

In the uplink, the load is defined based on total noise rise at the BS, the common receiver. In the downlink, multiple receivers are scattered in the cell. Therefore, the downlink load is defined based on average downlink noise rise, we have:

$$\text{Noise rise} = \frac{\overline{I_{DL}}}{N_0} = \frac{1}{1 - Load_{DL}(k)}$$

Equation 54

Other than the difference in load definition and physical meaning, outage probability computation and slot selection in the downlink are the same as in the uplink.

What is claimed is:

1. A method for call admission control comprising:
   measuring the signal to noise ratio of the radio link setup/reconfiguration request;
   measuring the signal to noise ratio of existing CCTrCHs in the target cell;
   measuring the signal to noise ratio of existing CCTrCHs in the neighboring cells; and
   accepting or rejecting a call admission based upon said measurements.

2. A method for call admission control in accordance with claim 1 further comprising determining the outage probability, and basing said call admission, at least in part, upon said determination.

3. A method of claim 2 wherein the outage probability is the probability that an instantaneous load in a timeslot exceeds a maximum allowed value.

4. A call admission control method for a communications system, comprising:
   a) employing dedicated measurements to accept or reject a request; and
   b) employing common measurements when dedicated elements are not available and employing estimated outage probability of the target cell and neighboring cells when common measurements are not available.

5. The method of claim 4 wherein step (b) further comprises:
   c) employing common measurements of a target cell.

6. The method of claim 5 wherein step (b) further comprises:
   d) employing common measurements of loading of the target cell and neighboring cells.

7. The method of claim 5 wherein step (b) further comprises:
   d) employing common measurements of weighted loading of the target cell and neighboring cells.

8. The method of claim 5 wherein step (b) further comprises:
   d) employing estimated common measurements after admission of a request.

9. The method of claim 4 wherein step (b) further comprises:
   c) employing common measurements of a target cell and neighboring cells.

10. The method of claim 4 where step (d) further comprises:
   e) employing estimated outage probability based on time variant signal-to-noise ratio (SIR).

11. The method of claim 10 wherein employing the time variant SIR comprises employing a required SIR and an SIR range of the request.

12. The method of claim 10 wherein employing the time variant SIR comprises employing a required SIR and SIR range of existing CCTrCHs in the target cell and neighboring cells.

13. The method of claim 4 wherein outage probability is a probability that an instantaneous load in a time slot exceeds a maximum allowed value.

* * * * *

UNITED STATES PATENT AND TRADEMARK OFFICE
CERTIFICATE OF CORRECTION

PATENT NO. : 6,778,812 B1
DATED : August 17, 2004
INVENTOR(S) : Guodong Zhang

It is certified that error appears in the above-identified patent and that said Letters Patent is hereby corrected as shown below:

Title page,
Item [73], Assignee, delete "Communication", and insert -- Corporation --.

Column 4,
Line 6, Equation 10, delete " $\frac{1}{N} \sum_{j=1, j \neq i}^{N} (Load_{UL}(j) + w \cdot Load_{UL}(i))$ " and insert -- $\frac{1}{N} \left( \sum_{j=1, j \neq i}^{N} Load_{UL}(j) + w \cdot Load_{UL}(i) \right)$ --.

Signed and Sealed this

Twenty-fourth Day of January, 2006

JON W. DUDAS
*Director of the United States Patent and Trademark Office*